(12) United States Patent
Yang et al.

(10) Patent No.: US 11,389,698 B2
(45) Date of Patent: Jul. 19, 2022

(54) FITNESS EQUIPMENT CONTROL SYSTEM, MOBILE APPARATUS AND FITNESS EQUIPMENT CONTROL METHOD THEREOF

(71) Applicant: Institute For Information Industry, Taipei (TW)

(72) Inventors: Ping-Che Yang, Taipei (TW); Pei-Yuan Tsai, Taipei (TW); Yu-Cheng Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 485 days.

(21) Appl. No.: 16/673,900

(22) Filed: Nov. 4, 2019

(65) Prior Publication Data

US 2021/0069552 A1  Mar. 11, 2021

(30) Foreign Application Priority Data

Sep. 5, 2019   (TW) .................................. 108132070

(51) Int. Cl.
    *A63B 24/00*    (2006.01)
    *G06F 3/01*     (2006.01)
    *A63B 71/06*    (2006.01)

(52) U.S. Cl.
    CPC ...... *A63B 24/0075* (2013.01); *A63B 24/0062* (2013.01); *A63B 24/0087* (2013.01);
    (Continued)

(58) Field of Classification Search
    USPC .......................................................... 434/247
    See application file for complete search history.

(56) References Cited

U.S. PATENT DOCUMENTS 6,033,344 A   3/2000 Trulaske et al.
6,997,852 B2  2/2006 Watterson et al.
              (Continued)

FOREIGN PATENT DOCUMENTS

CN   203852801 U   10/2014
CN   105920786 A    9/2016
              (Continued)

OTHER PUBLICATIONS

Office Action to the corresponding Chinese Patent Application dated Jun. 2, 2021, 24 pages (including English translation).
(Continued)

*Primary Examiner* — Pierre E Elisca
(74) *Attorney, Agent, or Firm* — CKC & Partners Co., LLC

(57) ABSTRACT

A fitness equipment control system is provided. The system includes a receiver and a mobile apparatus, and performs the operations: generating a first control signal based on a training course of a user; transmitting the first control signal to the receiver to make the receiver generates a signal which is readable by the fitness equipment according to the first control signal and transmit the readable signal to the fitness equipment; receiving at least one physiological signal from at least one of the wearable devices worn by the user; based on the training course and the at least one physiological signal, generating a second control signal; and when the second control signal is generated, transmitting the second control signal to the receiver, wherein the receiver generates a signal which is readable by the fitness equipment according to the second control signal and transmits it to the fitness equipment.

19 Claims, 5 Drawing Sheets

(52) U.S. Cl.
CPC .......... *A63B 71/0622* (2013.01); *G06F 3/011* (2013.01); *A63B 2071/0633* (2013.01); *A63B 2071/0694* (2013.01); *A63B 2220/836* (2013.01); *A63B 2225/54* (2013.01); *A63B 2230/045* (2013.01); *A63B 2230/62* (2013.01)

(56) References Cited

U.S. PATENT DOCUMENTS

| | | | |
|---|---|---|---|
| 7,398,176 B2* | 7/2008 | Bertness | H01M 10/44 73/146 |
| 9,824,287 B2 | 11/2017 | Wang et al. | |
| 10,507,358 B2* | 12/2019 | Kinnunen | G16H 40/67 |
| 2005/0172311 A1 | 8/2005 | Hjelt et al. | |
| 2009/0176629 A1 | 7/2009 | Yi | |
| 2012/0010478 A1* | 1/2012 | Kinnunen | G16H 20/30 600/301 |
| 2015/0227618 A1 | 8/2015 | Dong et al. | |
| 2016/0058335 A1 | 3/2016 | Ashby | |
| 2016/0346617 A1* | 12/2016 | Srugo | A63B 21/072 |
| 2018/0360340 A1 | 12/2018 | Rehse et al. | |
| 2021/0069552 A1* | 3/2021 | Yang | A63B 71/0622 |

FOREIGN PATENT DOCUMENTS

| | | |
|---|---|---|
| CN | 106474667 A | 3/2017 |
| CN | 106669111 A | 5/2017 |
| CN | 108261732 A | 7/2018 |
| EP | 1758040 A2 | 2/2007 |
| WO | 2015108702 A1 | 7/2015 |

OTHER PUBLICATIONS

Office Action to the corresponding Taiwan Patent Application rendered by the Taiwan Intellectual Property Office (TIPO) dated Dec. 2, 2020, 24 pages (including English translation).

* cited by examiner

| Training stages | Periods | Set parameters | Set conditions | |
|---|---|---|---|---|
| | | | | D |
| S1 | T1 | P1 | G1 | |
| S2 | T2 | P2 | G2 | |
| S3 | T3 | P3 | G3 | |

FIG. 3

FITNESS EQUIPMENT CONTROL SYSTEM, MOBILE APPARATUS AND FITNESS EQUIPMENT CONTROL METHOD THEREOF

PRIORITY

This application claims priority to Taiwan Patent Application No. 108132070 filed on Sep. 5, 2019, which is hereby incorporated by reference in its entirety.

FIELD

The present invention relates to a fitness equipment control system, a mobile apparatus and a fitness equipment control method thereof. More particularly, the present invention relates to a method of controlling a fitness equipment through a mobile apparatus.

BACKGROUND

In recent years, with the prevalence of exercising, people have paid more attention to various demands of sports, and various application programs and training courses for assisting in exercising have been introduced in succession in the market. In particular, general application programs and training courses introduced in the market usually only have standardized and fixed courses, e.g., traditional application programs only provide users with fixed training courses for daily or weekly exercise and provide users with the required time and speed of each training course as a reference, and the traditional application programs do not make adjustment according to physiological conditions of users at the time of exercising, and thus the traditional application programs cannot effectively assist the users in completing the training. In addition, since the user needs to manually set or adjust parameters of the fitness equipment by himself/herself according to the instruction content of the training course, it is unable to ensure that the user has set parameters correctly, and it is unable to determine whether the user has achieved the training target so as to automatically adjust the parameters of the fitness equipment in time to assist the user in achieving the training goal, and thus the training efficiency of the user is reduced.

In addition, since the traditional fitness equipment usually do not have the function of network connection and only has a simple operation panel, the user can only repeatedly and manually adjust various values of the fitness equipment to execute a predetermined training course when training. For example, when a user uses a traditional treadmill, if the user wants to increase the speed or the slope of the treadmill after jogging for five minutes according to the training course, it is usually necessary for the user to manually adjust the speed or the slope of the treadmill based on his/her own judgment, which is quite inconvenient.

However, even a high-level fitness equipment capable of networking and intelligent control cannot solve the above problems. Specifically, the intelligent control panel provided by the high-level fitness equipment is usually fixed on the high-level fitness equipment itself, and although the high-level fitness equipment can be connected to the network and download training courses, the training courses are limited to be directly used on the high-level fitness equipment and cannot be expanded for use on other machines, and thus the high-level fitness equipment lacks flexibility in use. Moreover, since the high-level fitness equipment is usually expensive, it will greatly increase the construction cost for gym operators or general users. Furthermore, the training courses provided by the intelligent control panel are still standardized and fixed training courses, the training courses cannot be adjusted for the user in real time with reference to the current physiological condition of the user, and the intelligent control panel cannot determine whether the user has achieved the training target so as to automatically adjust the parameters of the fitness equipment in time to assist the user in achieving the training goal.

Therefore, there is a need for a low-cost scheme that can effectively expand the traditional fitness equipment so that the traditional fitness equipment can be used in combination with application programs (e.g., a virtual trainer APP, a sports training APP, a course APP, etc.) in mobile apparatuses (e.g., smart phones), integrate the training courses with real-time physiological states of users, automatically convert the training courses into control signals that are inputted into the fitness equipment and adjust parameters of the fitness equipment, and can make adjustment (e.g., increase or decrease the speed of the treadmill) according to the physiological conditions of the users at the time of exercising.

Accordingly, there is an urgent need for a technique that can enable the traditional fitness equipment to be used in combination with the mobile apparatus in a low-cost scheme and enable to automatically adjust the parameters of the fitness equipment according to the real-time physiological states of the users.

SUMMARY

Provided is a fitness equipment control system. The fitness equipment control system may comprise a receiver and a mobile apparatus, the receiver is connected to a fitness equipment via wired connection, and the mobile apparatus is wirelessly connected to the receiver. The mobile apparatus generates a first control signal based on a training course of a user. The mobile apparatus transmits the first control signal to the receiver to make the receiver generates a first signal which is readable by the fitness equipment according to the first control signal and transmits the readable first signal to the fitness equipment. The mobile apparatus receives at least one physiological signal of the user from at least one wearable device worn by the user, and the at least one physiological signal comprises at least a heart rate. The mobile apparatus determines whether to generate a second control signal based on the training course and the at least one physiological signal. When the second control signal is generated, the mobile apparatus transmits the second control signal to the receiver, wherein the receiver generates a second signal which is readable by the fitness equipment according to the second control signal and transmits the readable second signal to the fitness equipment.

Also provided is a mobile apparatus for use with a receiver for controlling a fitness equipment. The receiver is connected to a fitness equipment via wired connection, and the mobile apparatus is wirelessly connected to the receiver. The mobile apparatus may comprise an interface and a processor electrically connected to the interface. The processor generates a first control signal based on a training course of a user. The processor transmits the first control signal to the receiver to make the receiver generates a first signal which is readable by the fitness equipment according to the first control signal and transmits the readable first signal to the fitness equipment. The processor receives at least one physiological signal of the user from at least one wearable device worn by the user, and the at least one physiological signal comprises at least a heart rate. The processor determines whether to generate a second control signal based on the training course and the at least one physiological signal. When the second control signal is generated, the processor transmits the second control signal to the receiver, wherein the receiver generates a second signal which is readable by the fitness equipment according to the second control signal and transmits the readable second signal to the fitness equipment.

Further provided is a fitness equipment control method, and the sport equipment control method is used among a mobile apparatus, a receiver and a fitness equipment. The receiver is connected to the fitness equipment via wired connection, and the mobile apparatus is wirelessly connected to the receiver. The fitness equipment control method is performed by the mobile apparatus and may comprise the following steps: generating a first control signal based on a training course of a user; transmitting the first control signal to the receiver to make the receiver generates a first signal which is readable by the fitness equipment according to the first control signal and transmits the readable first signal to the fitness equipment; receiving at least one physiological signal of the user from at least one wearable device worn by the user, the at least one physiological signal comprising at least a heart rate; based on the training course and the at least one physiological signal, determining whether to generate a second control signal; and when the second control signal is generated, transmitting the second control signal to the receiver, wherein the receiver generates a second signal which is readable by the fitness equipment according to the second control signal and transmits the readable second signal to the fitness equipment.

As can be known from the above description, the fitness equipment control technology (at least including the fitness equipment control system, the mobile apparatus and the fitness equipment control method thereof), through the combined use of the mobile apparatus, the receiver and the fitness equipment, enables the mobile apparatus to automatically generate a control signal readable by the fitness equipment so as to control the fitness equipment according to a training course suitable for a user. In addition, the mobile apparatus further determines whether to generate a control signal to adjust the fitness equipment during the training course of the user based on the training course and at least one piece of physiological information collected from at least one wearable device worn by the user, e.g., automatically adjusts the speed of the fitness equipment when the user fails to reach the predetermined target of the training course, or the like. The fitness equipment control technology provided by the present invention solves a plurality of problems in the prior art (e.g., the high-level fitness equipment is expensive, the training courses are standardized, and the training contents cannot be adjusted for users in real time, or the like).

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 3 depicts a specific exemplary example of a training course;

DETAILED DESCRIPTION

In the following description, a fitness equipment control system, a mobile apparatus and a fitness equipment control method thereof provided by the present invention will be explained with reference to certain example embodiments thereof. However, these example embodiments are not intended to limit the present invention to any environment, applications, embodiments, or implementations described in these example embodiments. Therefore, description of these example embodiments is only for purpose of illustration rather than to limit the scope of the present invention.

It shall be appreciated that, in the following embodiments and the attached drawings, elements unrelated to the present invention are omitted from depiction; and dimensions of and dimensional scales among individual elements in the attached drawings are provided only for illustration, but not to limit the scope of the present invention.

Figure 1:
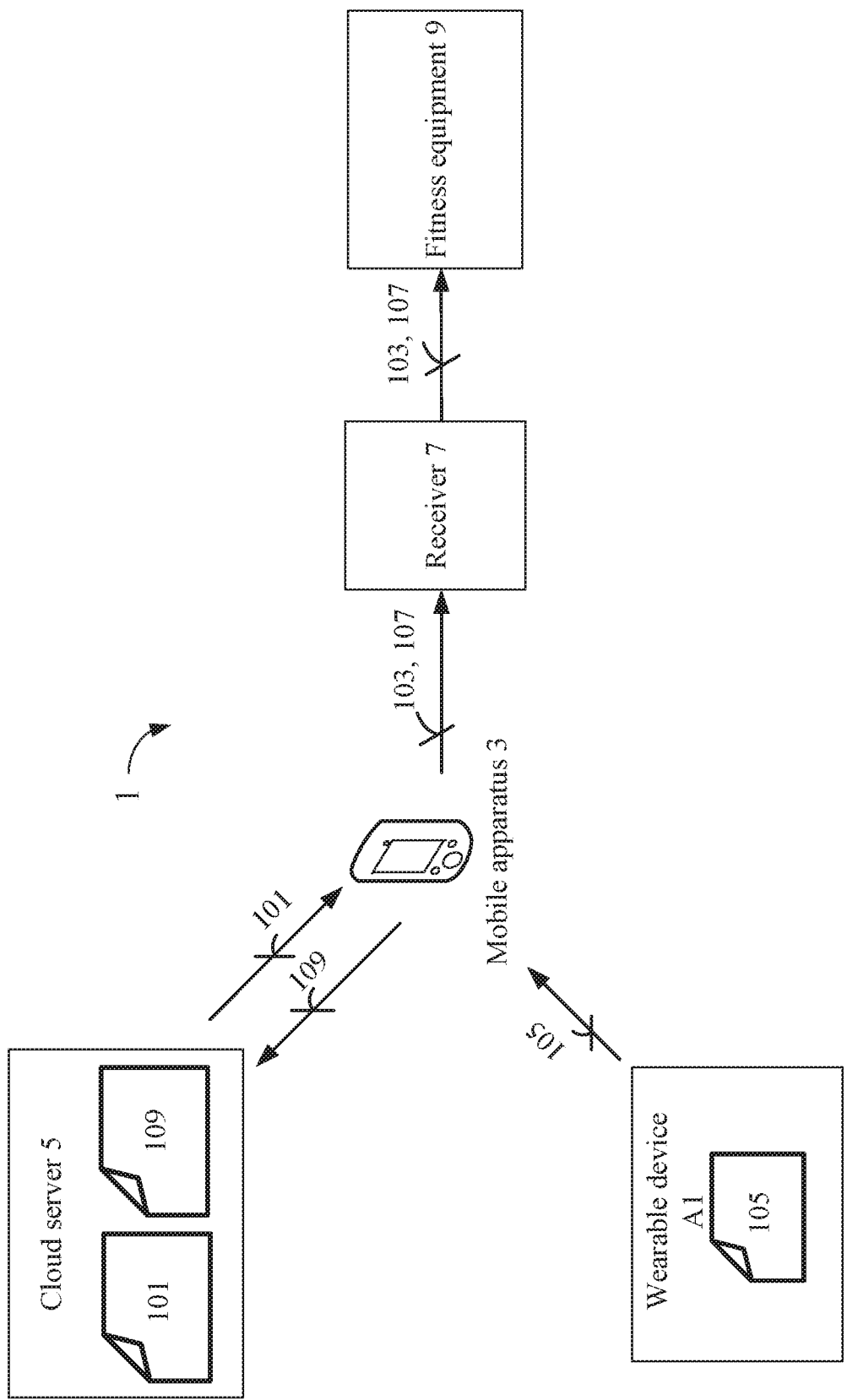
FIG. 1 depicts a schematic architectural view of a fitness equipment control system 1 according to a first embodiment.

A first embodiment of the present invention is a fitness equipment control system 1, and a schematic view thereof is depicted in FIG. 1. The application scenario of this embodiment is as follows: a user carries a mobile apparatus 3 and wears a wearable device A1 and is going to use the fitness equipment 9. It shall be appreciated that, the mobile apparatus 3 may be an apparatus capable of networking and performing basic computation, e.g., a smart phone, a tablet computer, a smart watch or the like.

The mobile apparatus 3 is connected with the receiver 7 based on wireless technologies, e.g., Near Field Communication (NFC), Bluetooth, Radio Frequency Identification (RFID) or any other technologies through which connection and communication with the mobile apparatus can be achieved. The receiver 7 can receive a signal from the mobile apparatus 3 through the aforesaid wireless technology and be connected to the fitness equipment 9 via wired connection, e.g., connected to the sport equipment 9 via a Universal Serial Bus (USB) interface, but it is not limited thereto.

The wearable device A1 of the user comprises a sensor used for detecting at least one physiological signal. For example, the wearable device A1 may be a smart watch, a smart wristband, a smart knee brace, a smart insole or other wearable electronic devices having sensors, that are used for detecting various physiological signals, e.g., the heart rate, the body temperature, the breathing rate, the pace frequency, the knee pressure, the foot pressure, or the like of the user. In some embodiments, the mobile apparatus 3 and the wearable device A1 may be a same device (e.g., a smart watch).

The fitness equipment 9 has a connection interface (not shown), and the fitness equipment 9 can be connected with the receiver 7 via wired connection through the connection interface. The connection interface may be a Peripheral Component Interconnect (PCI) interface, a Peripheral Component Interconnect Express (PCI Express) interface, a Universal Serial Bus (USB) interface or any other interfaces capable of receiving data from a device.

In this embodiment, the fitness equipment control system 1 comprises a mobile apparatus 3 and a receiver 7, the receiver 7 is connected to the fitness equipment 9 via wired connection, and the mobile apparatus 3 is wirelessly connected to the receiver 7 (i.e. in a wireless way). It shall be appreciated that, the numbers of the mobile apparatuses and the wearable devices included in a fitness equipment control system are not limited by the present invention. In other words, in other embodiments of the present invention, a fitness equipment control system may comprise a mobile apparatus and one or more wearable devices depending on the scale of the fitness equipment control system. However, for ease of illustration, a case in which a single user uses one mobile apparatus 3 and one wearable device A1 is taken as an example for illustration in this embodiment. In other embodiments, when there are multiple users, different mobile apparatuses 3 may be used respectively by the users to control their respective fitness equipments. The instance involving a plurality of wearable devices will be described later in the second embodiment.

First, before the user prepares to train on the fitness equipment 9, the user first operates the application program of the mobile apparatus 3 to obtain a training course 101 from the cloud server 5. For example, a user may log into the personal account of the user through an application program (e.g., a virtual trainer APP) to obtain the training course 101 of the user from the cloud server 5. In some embodiments, the training course 101 may also be stored in the mobile apparatus 3 in advance.

In this embodiment, the mobile apparatus 3 performs various operations or executes steps through the installed application program. The mobile apparatus 3 first generates a first control signal 103 by analyzing the content of the training course 101 and transmits the first control signal 103 to the fitness equipment 9 via the receiver 7 to set initial parameters of the fitness equipment 9 (e.g., the initial running speed of the treadmill). Next, after the user starts to use the fitness equipment 9, a physiological signal 105 of the user collected by the wearable device A1 is received. Subsequently, the mobile apparatus 3 determines whether to adjust parameters (e.g., the speed) of the fitness equipment 9 according to the content of the training course 101 and the physiological signal 105. If the mobile apparatus 3 determines that the parameters of the fitness equipment 9 need to be adjusted, then the second control signal 107 is transmitted to the receiver 7 connected to the fitness equipment 9, and the receiver 7 notifies the fitness equipment 9 so that the fitness equipment 9 can be adjusted correspondingly. By the above operations, the mobile apparatus 3 automatically controls the parameters of the fitness equipment 9 to achieve correct training.

Specifically, the operation flow of the fitness equipment control system 1 comprises the following operations. First, the mobile apparatus 3 generates a first control signal 103 based on the training course 101 of the user. Next, the mobile apparatus 3 transmits the first control signal 103 to the receiver 7 to make the receiver 7 generates a first signal (not shown) that is readable by the fitness equipment 9 according to the first control signal 103 and transmits the first signal to the fitness equipment 9. Subsequently, the mobile apparatus 3 receives the physiological signal 105 of the user from the wearable device A1 worn by the user, and the physiological signal 105 at least comprises a heart rate. The mobile apparatus 3 determines whether to generate a second control signal 107 based on the training course 101 and the physiological signal 105. When the second control signal 107 is generated, the second control signal 107 is transmitted to the receiver 7 to make the receiver 7 generates a second signal that is readable by the fitness equipment 9 according to the second control signal 107 and transmits the second signal to the fitness equipment 9. It shall be appreciated that, the conversion between the signals belongs to conventional technologies, such as the Bluetooth Packet Disassembly and Access Technology, Bluetooth Transmission Packet Data Captures, Bluetooth Packet Data Decodes, Packet Data Filters, and Packet Displays data or the like; and since the conversion is not the key point of the present invention and shall be appreciated by these of ordinary skill in the art, it will not be further described herein.

In some embodiments, the training course 101 further comprises a set condition corresponding to the heart rate, and the mobile apparatus 3 generates the second control signal 107 according to whether the heart rate received conforms to the set condition of the heart rate.

For example, the training course 101 may be a training course for running, and the training course 101 comprises a set condition that the target heart rate of the user is expected to reach 150 (beats/minute) within 20 minutes after the user starts the exercise. When the mobile apparatus 3 determines that the heart rate of the user has not reached the set condition 15 minutes after the user starts the exercise (for example, the highest heart rate of the user is only 120 (beats/minute)), the mobile apparatus 3 generates the second control signal 107 to automatically raise the speed of the fitness equipment 9 to further increase the exercise intensity, thereby achieving the goal of the training. In addition, the set condition of the training course 101 may also comprise another dangerous value (for example, a heart rate exceeding 190 (beats/minute)), which indicates that the user may be in a dangerous state if the heart rate exceeds this value. When the current heart rate of the user reaches the dangerous value during the sports training, the mobile apparatus 3 generates the second control signal 107 to quickly reduce the speed of the fitness equipment 9 or stop the fitness equipment 9 to ensure the safety of the user.

Figure 2:
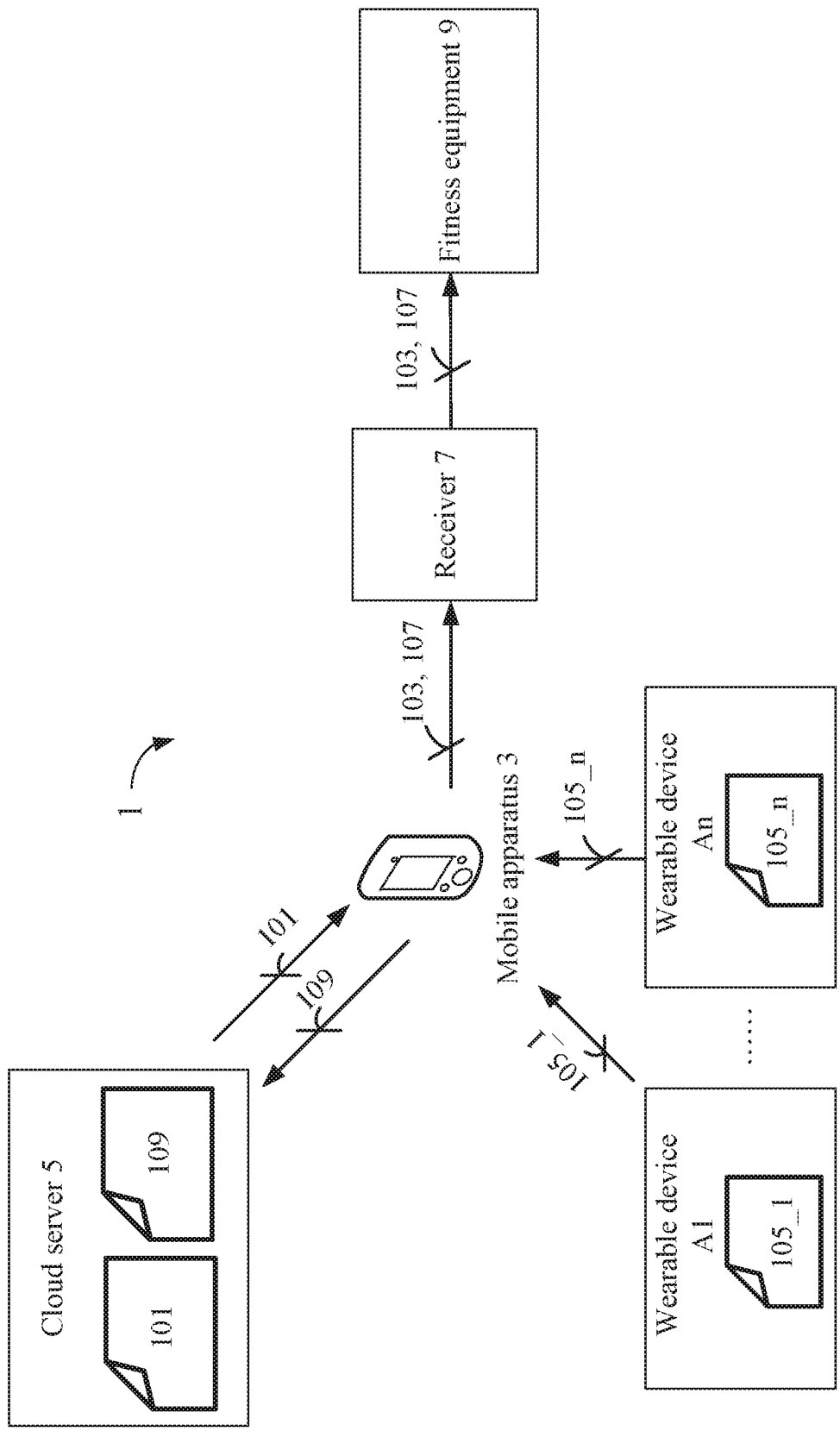
FIG. 2 depicts a schematic architectural view of a fitness equipment control system 1 according to a second embodiment.

A second embodiment of the present invention relates to an aspect of the fitness equipment control system 1 when a plurality of wearable devices are used, and a schematic view thereof is depicted in FIG. 2. Specifically, a user carries a mobile apparatus 3 and wears at least one of a wearable device A1, . . . , a wearable device An and is going to use the fitness equipment 9. The fitness equipment control system 1 comprises a mobile apparatus 3 and a receiver 7, the receiver 7 is connected to the fitness equipment 9 via wired connection, and the mobile apparatus 3 is wirelessly connected to the receiver 7. It shall be appreciated that, in some embodiments, the at least one wearable device worn by the user is at least one of a smart watch, a smart wristband, a smart knee brace, a smart insole and wearable electronic devices having sensors or a combination thereof, and the at least one wearable device comprises a sensor for detecting the at least one physiological signal of the user.

It shall be appreciated that, the second embodiment can execute all the operations and steps set forth in the first embodiment, have the same functions and deliver the same technical effects as the first embodiment. Thus, only the difference will be further described in the following paragraphs.

The second embodiment differs from the first embodiment in that, the mobile apparatus 3 collects the physiological signal of at least one of the wearable device A1, . . . , the wearable device An. In this embodiment, the mobile apparatus 3 first generates a first control signal 103 by analyzing the content of the training course 101 and transmits the first control signal 103 to the fitness equipment 9 to set initial parameters of the fitness equipment 9 (e.g., the initial running speed of the treadmill). Next, the mobile apparatus 3 receives at least one of a physiological signal 105_1, ..., a physiological signal 105_n of the user from at least one of the wearable device A1, ..., the wearable device An. Subsequently, the mobile apparatus 3 determines whether parameters (e.g., the speed) of the fitness equipment 9 need to be adjusted according to the content of the training course 101 and the at least one of the physiological signal 105_1, ..., the physiological signal 105_n. If the mobile apparatus 3 determines that the fitness equipment 9 needs to be adjusted, then the second control signal 107 is transmitted to the receiver 7 connected to the fitness equipment 9, and the receiver 7 notifies the the fitness equipment 9 so that the fitness equipment 9 can be adjusted correspondingly. By the above operations, the mobile apparatus 3 may make reference to multiple physiological signals simultaneously and adjust the fitness equipment 9 correspondingly according to the multiple physiological signals, thereby achieving effective training.

Specifically, the operation flow of the fitness equipment control system 1 comprises the following operations in this embodiment. First, the mobile apparatus 3 generates a first control signal 103 based on the training course 101 of the user. Next, the mobile apparatus 3 transmits the first control signal 103 to the receiver 7 to make the receiver 7 generates a first signal (not shown) that is readable by the fitness equipment according to the first control signal 103 and transmits the first signal to the fitness equipment 9. Subsequently, the mobile apparatus 3 receives at least one of the physiological signal 105_1, ..., the physiological signal 105_n of the user from at least one of the wearable device A1, ..., the wearable device An worn by the user, and the at least one of the physiological signal 105_1, ..., the physiological signal 105_n at least comprises a heart rate. Next, the mobile apparatus 3 determines whether to generate a second control signal 107 based on the training course 101 and the at least one of the physiological signal 105_1, ..., the physiological signal 105_n. When the second control signal 107 is generated, the second control signal 107 is transmitted to the receiver 7 to make the receiver 7 generates a second signal that is readable by the fitness equipment 9 according to the second control signal 107 and transmits the second signal to the fitness equipment 9.

In some embodiments, the training course further comprises a set condition corresponding to the at least one physiological signal, and the mobile apparatus generates the second control signal according to whether the at least one physiological signal received conforms to the set condition of the at least one physiological signal.

For example, the training course 101 may train the heart rate and the pace frequency simultaneously, and the training course 101 comprises a set condition that the target heart rate of the user is expected to reach 150 (beats/minute) and the pace frequency is expected to reach 160 (steps/minute) within 20 minutes after the user starts the exercise. When the mobile apparatus 3 determines that at least one of the heart rate or the pace frequency of the user currently has not reached the set condition (e.g., the highest heart rate is only 120 (beats/minute) or the highest pace frequency is only 140 (steps/minute) 15 minutes after the user starts the exercise), the mobile apparatus 3 will generate the second control signal 107 to automatically raise the speed of the fitness equipment 9 to further increase the exercise intensity, thereby achieving the goal of the training. The aforesaid heart rate may be obtained by detecting the heart rate value using a heart rate sensor of a smart wristband or a smart watch, and the pace frequency may be obtained by detecting the pressure change data using a pressure sensor at the sole and through analysis of time and pressure points. It shall be appreciated that, the contents of the training course, the physiological signal and the set condition are not limited by the present invention, and any training course including a set condition corresponding to at least one physiological signal falls within the scope claimed by the present invention. These contents shall be appreciated by these of ordinary skill in the art, and thus will not be further described herein.

In some embodiments, the training course further comprises at least one training stage, each of the at least one training stage comprises a set parameter and a period corresponding to the fitness equipment, at least one of the at least one training stage comprises a set condition corresponding to the at least one physiological signal (i.e. each training stage comprises a set parameter and a period corresponding to the fitness equipment, and at least one of the training stage comprises a set condition corresponding to the at least one physiological signal), and the mobile apparatus further performs the following operations: generating the first control signal corresponding to each of the at least one training stage according to the set parameter and the period of each of the at least one training stage; and when the fitness equipment is executed according to the first control signal of each of the at least one training stage and the training stage that is executed has the set condition corresponding to the at least one physiological signal, generating the second control signal according to whether the at least one physiological signal received conforms to the set condition of the at least one physiological signal corresponding to the training stage executed.

For ease of understanding, reference is made to a specific exemplary example shown in FIG. 3, but this specific exemplary example is not intended to limit the scope of the present invention. In this specific exemplary example, the training course 101 is a training course for running that should be used in combination with a fitness equipment (e.g. a treadmill), and meanings of various values will be respectively described in detail below. The training course 101 has a first training stage S1, a second training stage S2 and a third training stage S3. The periods T1, T2 and T3 respectively represent time intervals of 0 to 10 (minutes), 10 to 20 (minutes) and 20 to 30 (minutes). The set parameters P1, P2 and P3 respectively represent that the numerical ranges set for the fitness equipment are respectively 4 (km/h), 6 (km/h) and 8 (km/h). The set conditions G1, G2 and G3 are respectively target heart rates of 120 (beats/minute), 130 (beats/minute), 150 (beats/minute) and the danger value D can represent that the heart rate reaches 190 (beats/minute) in all the three stages.

First, according to the training course 101, the mobile apparatus 3 generates a control signal during the first training stage S1 to make the fitness equipment 9 starts to operate at the set parameter P1 (i.e., a speed of 4 (km/h)). Then, after the user starts to exercise, the mobile apparatus 3 compares the physiological signal received with the value of the set condition according to the received physiological signal to determine whether to generate the second control signal. When it is determined that the physiological signal is lower than the set condition G1 corresponding to the first training stage S1 (i.e., the target heart rate of 120 (beats/minute)), for example, when the heart rate of the user has not reach the target heart rate of 120 (beats/minute) five minutes after the start of the exercise, the mobile apparatus 3 will generate a second control signal so that the fitness equipment 9 is accelerated gradually. That is, if the heart rate has not reached the target heart rate of 120 (beats/minute) yet one minute after the fitness equipment 9 has been accelerated, then the fitness equipment can be accelerated again (e.g., by 0.5 (km/h) at a time). When it is determined that the physiological signal has met the set condition G1 corresponding to the first training stage S1, it means that the user has met the target of the first training stage S1 and will continue the exercise at the current speed until the end of this stage. In addition, when it is determined that the physiological signal has reached the dangerous value (i.e. 190 (beats/minute)), the mobile apparatus 3 will generate a second control signal to quickly reduce the speed of the fitness equipment 9 or stop the fitness equipment 9 to ensure the safety of the user. Next, the mobile apparatus 3 will continuously make the determination (e.g., at a frequency of once every minute) according to the above rules until the first training stage S1 is completed and then the second training stage S2 is started. The operation of the second training stage S2 is the same as that of the first training stage S1, and contents thereof shall be appreciated by these of ordinary skill in the art, and thus it will not be further described herein.

It shall be appreciated that, the speed can only be increased in each stage to the upper limit of the set parameters of that stage (e.g., an upper limit of P1 is 5 (km/h)), and if the target has not been met at the end of that stage, then the mobile apparatus 3 may also evaluate the training results of the user with a value (e.g., a training completion degree of 75%) as a reference for arranging training courses for the user in the future. In some embodiments, the mobile apparatus 3 may also calculate an adjustment parameter of the fitness equipment according to the difference between the physiological signal and the set condition, and then generate a second control signal according to the adjustment parameter to make the adjustment of the control signal more efficient. For example, when the fitness equipment 9 fails to raise the heart rate of the user to the target of each stage by adjusting the parameter to increase the speed by 0.5 (km/h) each time, the adjustment parameter may be modified to be increased by 0.6 (km/h) or more each time.

In some embodiments, the mobile apparatus 3 further performs the following operation: providing the user with a training suggestion according to the at least one physiological signal. For example, the mobile apparatus 3 may also provide voice guidance, and the mobile apparatus 3 may provide the user with training suggestions such as to increase the breathing frequency and increase the pace frequency or the like according to physiological signal. In addition, the user may also interact with the mobile apparatus 3 through voice to obtain information such as the current ranking, the completed progress or the like. For example, the mobile apparatus 3 may be connected to the cloud server 5 to obtain suggestion corresponding to the difference between the physiological signal and the set condition. Alternatively, the suggestion may be built and stored in the mobile apparatus 3 in advance, and when the physiological signal has not met the set condition five minutes after the user starts the exercise, the mobile apparatus 3 may convert the suggestion into voice via a voice synthesizer and then play the voice by a speaker of the mobile apparatus 3.

In some embodiments, the mobile apparatus 3 further performs the following operation: analyzing a posture of the user and providing the user with a suggestion for posture improvement. For example, the mobile apparatus 3 may further analyze various physiological signals such as the knee pressure, the foot pressure or the like through wearable electronic devices having sensors such as a pressure sensor, a motion sensor, an inertial measurement unit (IMU), an intelligent knee brace, and an intelligent insole or the like so as to analyze the posture of the user (e.g., using a posture analysis model) and provide the user with a suggestion for posture improvement. In some embodiments, the aforementioned information may be further presented to the user as a visual image. The posture analysis model and analysis function described above may also be installed in the cloud server 5. The mobile apparatus 3 is connected to the cloud server 5 and transmits various physiological signals to the cloud server 5, the cloud server 5 performs analysis and provides suggestions for posture improvement or visual images (e.g., films or picture files showing suitable running postures) back to the mobile apparatus 3. The mobile apparatus 3 converts the suggestions for posture improvement or visual images into voice via a voice synthesizer and then play the voice by a speaker or the visual image is displayed via a screen of the mobile apparatus 3.

In some embodiments, the mobile apparatus 3 further stores historical data for physiological signal of the user and further performs the following operations: adjusting the set condition corresponding to the at least one physiological signal in the training course according to the historical data for physiological signal of the user. In some embodiments, the mobile apparatus 3 further performs the following operation: storing a sports process 109 of the user and transmitting the sports process 109 to the cloud server 5 or other cloud apparatuses. For example, the mobile apparatus 3 has a storage (not shown), and may further store the sports process 109 (e.g., the completion degree of each training stage, relevant records such as the average speed and pace frequency, physiological signals such as the average heart rate and the maximum heart rate, etc.) of the user and transmit the sports process 109 back to the cloud server 5 or other cloud apparatuses as a reference for subsequent training courses.

As can be known from the above description, the fitness equipment control technology provided by the present invention, through the combined use of the mobile apparatus 3, the receiver 7 and the fitness equipment 9, enables the mobile apparatus 3 to automatically generate a control signal readable by the fitness equipment so as to control the fitness equipment 9 according to a training course suitable for a user. In addition, the mobile apparatus 3 further determines whether to generate a control signal to adjust the fitness equipment 9 during the training course of the user based on the training course and at least one piece of physiological information collected from at least one wearable device worn by the user, e.g., automatically adjusts the speed of the fitness equipment when the user fails to reach the predetermined target of the training course, or the like. The fitness equipment control technology provided by the present invention solves a plurality of problems in the prior art (e.g., the high-level fitness equipment is expensive, the training courses are standardized, and the training contents cannot be adjusted for users in real time, or the like).

Figure 4:
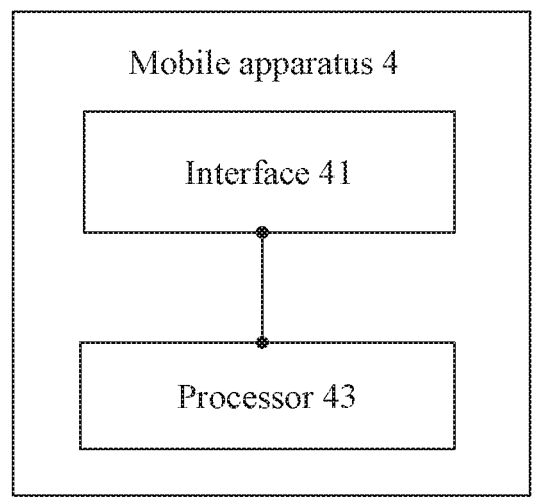
FIG. 4 depicts a schematic architectural view of a mobile apparatus according to a third embodiment.

A third embodiment of the present invention is a mobile apparatus for use with a receiver, and a schematic view thereof is depicted in FIG. 4. The mobile apparatus 4 comprises an interface 41 and a processor 43 which are electrically connected to each other. The interface 41 may be a Near Field Communication (NFC) interface, a Bluetooth interface, a Radio Frequency Identification (RFID) interface or any other interfaces capable of connecting and communicating with apparatuses. The processor 43 may be one of various processors, central processing units, microprocessors, digital signal processors or other computing devices known to these of ordinary skill in the art. The mobile apparatus 4 is suitable for the environment of FIG. 1 or FIG. 2, and can perform all operations of the mobile apparatus 3 described in the first embodiment and the second embodiment.

In this embodiment, the mobile apparatus 4 is for use with a receiver (e.g., the receiver 7 described in the first embodiment and the second embodiment), the receiver is connected to a fitness equipment (e.g., the fitness equipment 9 described in the first embodiment and the second embodiment) via wired connection, and the mobile apparatus 4 is wirelessly connected to the receiver. The mobile apparatus 4 comprises an interface 41 and a processor 43, and the processor 43 is electrically connected to the interface 41. The processor 43 generates a first control signal (e.g., the first control signal 103 described in the first embodiment and the second embodiment) based on a training course of a user (e.g., the training course 101 described in the first embodiment and the second embodiment). The processor 43 transmits the first control signal to the receiver to make the receiver generates a first signal that is readable by the fitness equipment according to the first control signal and transmits the first signal to the fitness equipment. The processor 43 receives at least one physiological signal of the user from at least one wearable device worn by the user (e.g., the wearable device described in the first embodiment and the second embodiment), and the at least one physiological signal at least comprises a heart rate. The processor 43 determines whether to generate a second control signal (e.g., the second control signal 107 described in the first embodiment and the second embodiment) based on the training course and the at least one physiological signal. When the second control signal is generated, the processor 43 transmits the second control signal to the receiver, wherein the receiver generates a second signal that is readable by the fitness equipment according to the second control signal and transmits the second signal to the fitness equipment.

In some embodiments, the training course further comprises a set condition corresponding to the at least one physiological signal, and the processor 43 generates the second control signal according to whether the at least one physiological signal received conforms to the set condition corresponding to the at least one physiological signal.

In some embodiments, the training course further comprises a set condition corresponding to the heart rate, and the processor 43 generates the second control signal according to whether the heart rate received conforms to the set condition corresponding to the heart rate.

In some embodiments, the training course comprises at least one training stage, each of the at least one training stage comprises a set parameter and a period corresponding to the fitness equipment, at least one of the at least one training stage comprises a set condition corresponding to the at least one physiological signal (i.e. each training stage comprises a set parameter and a period corresponding to the fitness equipment, and at least one of the training stage comprises a set condition corresponding to the at least one physiological signal), and the processor 43 further performs the following operations: generating the first control signal corresponding to each of the at least one training stage according to the set parameter and the period of each of the at least one training stage; and when the fitness equipment is executed according to the first control signal of each of the at least one training stage and the training stage that is executed has the set condition corresponding to the at least one physiological signal, generating the second control signal according to whether the at least one physiological signal received conforms to the set condition of the at least one physiological signal corresponding to the training stage executed.

In some embodiments, the processor 43 further performs the following operation: analyzing a posture of the user and providing the user with a suggestion for posture improvement.

In addition to the aforesaid steps, the third embodiment can also execute all the operations and steps of the mobile apparatus 3 set forth in the first and second embodiments, have the same functions and deliver the same technical effects as the first and second embodiments. How the third embodiment executes these operations and steps, has the same functions and delivers the same technical effects as the first and second embodiments will be readily appreciated by those of ordinary skill in the art based on the explanation of the first and second embodiments, and thus will not be further described herein.

Figure 5:
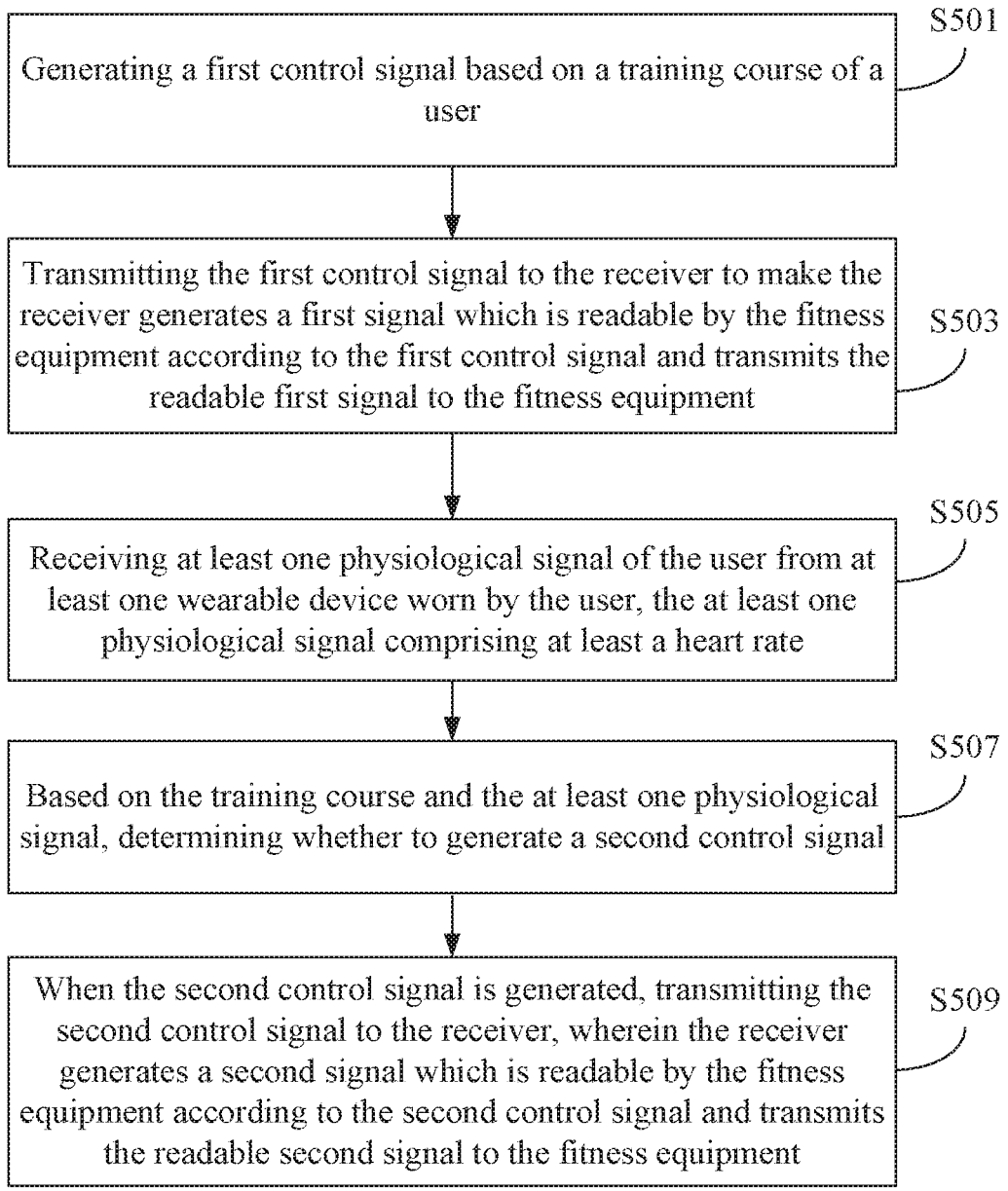
FIG. 5 depicts a partial flowchart diagram of a fitness equipment control method according to a fourth embodiment.

A fourth embodiment of the present invention is a fitness equipment control method, and a flowchart diagram thereof is depicted in FIG. 5. The fitness equipment control method is used among a mobile apparatus, a receiver and a fitness equipment, wherein the receiver is connected to the fitness equipment via wired connection, the mobile apparatus is wirelessly connected to the receiver, and the method is performed by the mobile apparatus, e.g., the mobile apparatus 3 described in the first embodiment and the second embodiment. The fitness equipment control method controls the fitness equipment through steps S501 to S509.

In the step S501, the mobile apparatus generates a first control signal based on a training course of a user. In the step S503, the mobile apparatus transmits the first control signal to the receiver to make the receiver generates a first signal which is readable by the fitness equipment according to the first control signal and transmits the readable first signal to the fitness equipment.

Next, in the step S505, the mobile apparatus receives at least one physiological signal of the user from at least one wearable device worn by the user, and the at least one physiological signal comprises at least a heart rate.

Thereafter, in the step S507, the mobile apparatus determines whether to generate a second control signal based on the training course and the at least one physiological signal. In the step S509, when the second control signal is generated, the mobile apparatus transmits the second control signal to the receiver, wherein the receiver generates a second signal which is readable by the fitness equipment according to the second control signal and transmits the readable second signal to the fitness equipment.

In some embodiments, the training course further comprises a set condition corresponding to the at least one physiological signal, and the mobile apparatus further performs the following step: generating the second control signal according to whether the at least one physiological signal received conforms to the set condition corresponding to the at least one physiological signal.

In some embodiments, the training course further comprises a set condition corresponding to the heart rate, and the mobile apparatus further performs the following step: generating the second control signal according to whether the heart rate received conforms to the set condition corresponding to the heart rate.

In some embodiments, the training course comprises at least one training stage, each of the at least one training stage comprises a set parameter and a period corresponding to the fitness equipment, at least one of the at least one training stage comprises a set condition corresponding to the at least one physiological signal, and the mobile apparatus further performs the following steps: generating the first control signal corresponding to each of the at least one training stage according to the set parameter and the period of each of the at least one training stage; and when the fitness equipment is executed according to the first control signal of each of the at least one training stage and the training stage that is executed has the set condition corresponding to the at least one physiological signal, generating the second control signal according to whether the at least one physiological signal received conforms to the set condition of the at least one physiological signal corresponding to the training stage executed.

In some embodiments, the mobile apparatus further performs the following step: analyzing a posture of the user and providing the user with a suggestion for posture improvement.

In addition to the aforesaid steps, the fourth embodiment can also execute all the operations and steps of the mobile apparatus 3 set forth in the first and second embodiments, have the same functions and deliver the same technical effects as the first and second embodiments. How the fourth embodiment executes these operations and steps, has the same functions and delivers the same technical effects as the first and second embodiments will be readily appreciated by those of ordinary skill in the art based on the explanation of the first and second embodiments, and thus will not be further described herein.

It shall be appreciated that, in the specification and the claims of the present invention, some words (including: control signals and signals) are preceded by "first" or "second", and the "first" and "second" are only used to distinguish different words. For example, the "first" and "second" in the first control signal and the second control signal are only used to represent control signals of different stages.

According to the above descriptions, the fitness equipment control technology (at least including the fitness equipment control system, the mobile apparatus and the fitness equipment control method thereof) provided by the present invention, through the combined use of the mobile apparatus, the receiver and the fitness equipment, enables the mobile apparatus to automatically generate a control signal readable by the fitness equipment so as to control the fitness equipment according to a training course suitable for a user. In addition, the mobile apparatus further determines whether to generate a control signal to adjust the fitness equipment during the training course of the user based on the training course and at least one piece of physiological information collected from at least one wearable device worn by the user, e.g., automatically adjusts the speed of the fitness equipment when the user fails to reach the predetermined target of the training course, or the like. The fitness equipment control technology provided by the present invention solves a plurality of problems in the prior art (e.g., the high-level fitness equipment is expensive, the training courses are standardized, and the training contents cannot be adjusted for users in real time, or the like).

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A fitness equipment control system, comprising:
a receiver, being connected to a fitness equipment via wired connection; and
a mobile apparatus, being wirelessly connected to the receiver and being configured to perform the following operations:
generating a first control signal based on a training course of a user;
transmitting the first control signal to the receiver to make the receiver generates a first signal which is readable by the fitness equipment according to the first control signal and transmits the readable first signal to the fitness equipment;
receiving at least one physiological signal of the user from at least one wearable device worn by the user, the at least one physiological signal comprising at least a heart rate;
based on the training course and the at least one physiological signal, determining whether to generate a second control signal; and
when the second control signal is generated, transmitting the second control signal to the receiver, wherein the receiver generates a second signal which is readable by the fitness equipment according to the second control signal and transmits the readable second signal to the fitness equipment.

2. The fitness equipment control system of claim 1, wherein the training course further comprises a set condition corresponding to the at least one physiological signal, and the mobile apparatus generates the second control signal according to whether the at least one physiological signal received conforms to the set condition corresponding to the at least one physiological signal.

3. The fitness equipment control system of claim 2, wherein the mobile apparatus further stores historical data for physiological signal of the user and further performs the following operation:
adjusting the set condition corresponding to the at least one physiological signal in the training course according to the historical data for physiological signal of the user.

4. The fitness equipment control system of claim 1, wherein the training course further comprises a set condition corresponding to the heart rate, and the mobile apparatus generates the second control signal according to whether the heart rate received conforms to the set condition corresponding to the heart rate.

5. The fitness equipment control system of claim 1, wherein the at least one wearable device worn by the user is at least one of a smart watch, a smart wristband, a smart knee brace, a smart insole and wearable electronic devices having sensors or a combination thereof, and the at least one wearable device comprises a sensor used for detecting the at least one physiological signal.

6. The fitness equipment control system of claim 1, wherein the training course comprises at least one training stage, each of the at least one training stage comprises a set parameter and a period corresponding to the fitness equipment, at least one of the at least one training stage comprises a set condition corresponding to the at least one physiological signal, and the mobile apparatus further performs the following operations:
generating the first control signal corresponding to each of the at least one training stage according to the set parameter and the period of each of the at least one training stage; and when the fitness equipment is executed according to the first control signal of each of the at least one training stage and the training stage that is executed has the set condition corresponding to the at least one physiological signal, generating the second control signal according to whether the at least one physiological signal received conforms to the set condition of the at least one physiological signal corresponding to the training stage executed.

7. The fitness equipment control system of claim 1, wherein the mobile apparatus further performs the following operation:
providing the user with a training suggestion according to the at least one physiological signal.

8. The fitness equipment control system of claim 1, wherein the mobile apparatus further performs the following operation:
analyzing a posture of the user and providing the user with a suggestion for posture improvement.

9. The fitness equipment control system of claim 1, wherein the mobile apparatus further performs the following operation:
storing a sports process of the user and transmitting the sports process to a cloud apparatus.

10. A mobile apparatus for use with a receiver, the receiver being connected to a fitness equipment via wired connection, the mobile apparatus being wirelessly connected to the receiver and comprising:
an interface; and
a processor, being electrically connected to the interface and performing the following operations, comprising:
generating a first control signal based on a training course of a user;
transmitting the first control signal to the receiver to make the receiver generates a first signal which is readable by the fitness equipment according to the first control signal and transmits the readable first signal to the fitness equipment;
receiving at least one physiological signal of the user from at least one wearable device worn by the user, the at least one physiological signal comprising at least a heart rate;
based on the training course and the at least one physiological signal, determining whether to generate a second control signal; and
when the second control signal is generated, transmitting the second control signal to the receiver, wherein the receiver generates a second signal which is readable by the fitness equipment according to the second control signal and transmits the readable second signal to the fitness equipment.

11. The mobile apparatus of claim 10, wherein the training course further comprises a set condition corresponding to the at least one physiological signal, and the processor generates the second control signal according to whether the at least one physiological signal received conforms to the set condition corresponding to the at least one physiological signal.

12. The mobile apparatus of claim 10, wherein the training course further comprises a set condition corresponding to the heart rate, and the processor generates the second control signal according to whether the heart rate received conforms to the set condition corresponding to the heart rate.

13. The mobile apparatus of claim 10, wherein the training course comprises at least one training stage, each of the at least one training stage comprises a set parameter and a period corresponding to the fitness equipment, at least one of the at least one training stage comprises a set condition corresponding to the at least one physiological signal, and the processor further performs the following operations:
generating the first control signal corresponding to each of the at least one training stage according to the set parameter and the period of each of the at least one training stage; and
when the fitness equipment is executed according to the first control signal of each of the at least one training stage and the training stage that is executed has the set condition corresponding to the at least one physiological signal, generating the second control signal according to whether the at least one physiological signal received conforms to the set condition of the at least one physiological signal corresponding to the training stage executed.

14. The mobile apparatus of claim 10, wherein the processor further performs the following operation:
analyzing a posture of the user and providing the user with a suggestion for posture improvement.

15. A fitness equipment control method, being used among a mobile apparatus, a receiver and a fitness equipment, the receiver being connected to the fitness equipment via wired connection, the mobile apparatus being wirelessly connected to the receiver, the fitness equipment control method comprising performing the following steps by the mobile apparatus:
generating a first control signal based on a training course of a user;
transmitting the first control signal to the receiver to make the receiver generates a first signal which is readable by the fitness equipment according to the first control signal and transmits the readable first signal to the fitness equipment;
receiving at least one physiological signal of the user from at least one wearable device worn by the user, the at least one physiological signal comprising at least a heart rate;
based on the training course and the at least one physiological signal, determining whether to generate a second control signal; and
when the second control signal is generated, transmitting the second control signal to the receiver, wherein the receiver generates a second signal which is readable by the fitness equipment according to the second control signal and transmits the readable second signal to the fitness equipment.

16. The fitness equipment control method of claim 15, wherein the training course further comprises a set condition corresponding to the at least one physiological signal, and the mobile apparatus further performs the following step:
generating the second control signal according to whether the at least one physiological signal received conforms to the set condition corresponding to the at least one physiological signal.

17. The fitness equipment control method of claim 15, wherein the training course further comprises a set condition corresponding to the heart rate, and the mobile apparatus further performs the following step:
generating the second control signal according to whether the heart rate received conforms to the set condition corresponding to the heart rate.

18. The fitness equipment control method of claim 15, wherein the training course comprises at least one training stage, each of the at least one training stage comprises a set parameter and a period corresponding to the fitness equipment, at least one of the at least one training stage comprises a set condition corresponding to the at least one physiological signal, and the mobile apparatus further performs the following steps:
- generating the first control signal corresponding to each of the at least one training stage according to the set parameter and the period of each of the at least one training stage; and
- when the fitness equipment is executed according to the first control signal of each of the at least one training stage and the training stage that is executed has the set condition corresponding to the at least one physiological signal, generating the second control signal according to whether the at least one physiological signal received conforms to the set condition of the at least one physiological signal corresponding to the training stage executed.

19. The fitness equipment control method of claim 15, wherein the mobile apparatus further performs the following step:
- analyzing a posture of the user and providing the user with a suggestion for posture improvement.

* * * * *